United States Patent [19]

Mafoti

[11] Patent Number: 5,239,038

[45] Date of Patent: Aug. 24, 1993

[54] CYCLOHEXANEDIMETHANOLADIPATE BASED PREPOLYMERS AND REACTION INJECTION MOLDED PRODUCTS MADE THEREFROM

[75] Inventor: Robson Mafoti, Pittsburgh, Pa.

[73] Assignee: Miles Inc., Pittsburgh, Pa.

[21] Appl. No.: 442,805

[22] Filed: Nov. 29, 1989

[51] Int. Cl.$^5$ ............................................. C08G 18/00
[52] U.S. Cl. ........................................ 528/44; 528/79; 528/80; 521/51; 521/176
[58] Field of Search .................. 521/51, 76, 176; 528/44, 79, 80

[56] References Cited

U.S. PATENT DOCUMENTS

| | | | |
|---|---|---|---|
| 4,218,543 | 8/1980 | Weber et al. | 521/51 |
| 4,284,750 | 8/1981 | Amirsakis | 528/79 |
| 4,376,834 | 3/1983 | Goldwasser et al. | 528/60 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,525,424 | 6/1985 | Bradshaw | 428/425.9 |
| 4,530,941 | 7/1985 | Turner et al. | 521/176 |
| 4,590,219 | 5/1986 | Nissen et al. | 521/51 |
| 4,774,263 | 9/1988 | Weber et al. | 521/51 |
| 4,847,561 | 7/1989 | Soohoo | 423/316 |
| 4,857,561 | 8/1989 | Mafoti et al. | 521/159 |

FOREIGN PATENT DOCUMENTS 3215907 11/1983 Fed. Rep. of Germany .
3215909 11/1983 Fed. Rep. of Germany .

*Primary Examiner*—John Kight, III
*Assistant Examiner*—Duc Truong
*Attorney, Agent, or Firm*—Joseph C. Gil; Godfried R. Akorli

[57] ABSTRACT

The present invention is directed to a polyisocyanate prepolymer prepared by reacting an isocyanate based on 4,4-methylenebis(phenyl isocyanate) and a polyester polyol by reacting 1,4-cyclohexanedimethanol and adipic acid. The invention is also directed to a RIM process using such prepolymers.

7 Claims, No Drawings

CYCLOHEXANEDIMETHANOLADIPATE BASED PREPOLYMERS AND REACTION INJECTION MOLDED PRODUCTS MADE THEREFROM

BACKGROUND OF THE INVENTION

U.S. Pat. No. 4,4,218,543 describes the production of reaction injection molded (RIM) products using reaction mixtures of diisocyanates or polyisocyanates based on 4,4'-isocyanatodiphenyl methane, aromatic polyamines, and relatively high molecular weight polyhydroxyl compounds.

Recent advances in the RIM area have been directed to the substitution of so-called "amino-polyethers" for all or a portion of the relatively high molecular weight polyhydroxyl compounds. See, e.g., U.S. Pat. Nos. 4,396,729, 4,433,067, 4,444,910, 4,530,941, 4,590,219 and 4,774,263; and German Offenlegungsschriften 3,215,907 and 3,215,909. Typically, the isocyanates used with the amino-polyethers have included (i) liquid products made by reacting 4,4'-diphenylmethane diisocyanate with tripropylene glycol, (ii) liquid modified 4,4'-diphenylmethane diisocyanates containing carbodiimide groups and (iii) prepolymers from 4,4'-diphenylmethane diisocyanate and polyethers (see the first five references noted in this paragraph). U.S. Pat. No. 4,590,219 also described the use of a prepolymer from 4,4'diphenylmethane diisocyanate and a diethylene glycol adipate (having an OH number of 42).

U.S. Pat. No. 4,857,561 describes prepolymers based on neopentyladipate and the use of such prepolymers in a RIM process.

Recently, our company has evaluated the use of a prepolymer derived from 4,4'-diphenylmethane diisocyanate, a polyester (having a molecular weight of 2000 and produced from adipic acid, ethylene glycol, and butanediol), and a carbodiimidized 4,4'-diphenylmethane diisocyanate. Although this particular prepolymer, when sued in a RIM process with amino polyethers yields products having excellent physical properties, it still suffers from some drawbacks. Specifically, the prepolymer is generally incompatible with the amino polyethers. This results in poor mixing and the production of non-homogeneous parts. Additionally, when zinc stearate internal mold release agents are used, the hydrolytic stability of the molded part is adversely affected.

U.S. Pat. Nos. 4,284,750 and 4,525,424 describe the use of a polyester based on cyclohexane dimethanol in the production of flexible magnetic recording media.

DESCRIPTION OF THE INVENTION

The present invention overcomes the problems noted above. More particularly, the present invention is directed to novel polyester-based prepolymers, a RIM process using such prepolymers, and the parts produced by that process. The prepolymer of the present invention broadly comprises the reaction product of (a) an isocyanate selected from the group consisting of methylene bis(phenylisocyanate), polymethylene-poly(phenylisocyanate), and mixtures thereof, and (b) a polyester polyol having a hydroxyl functionality of from 2 to 3, and a molecular weight of from about 750 to about 3500, said polyester polyol prepared by reacting 1,4-cyclohexanedimethanol and adipic acid, the isocyanate group content of said reaction product being from about 14% to about 28% by weight. The invention also relates to a method of making a reaction injection molded part by reacting in a closed mold (i) a relatively high molecular weight active hydrogen containing material, (ii) an amine terminated chain extender, and (iii) the prepolymer of the present invention. Finally, the invention is directed to the product made by the above process.

The prepolymer of the present invention requires an isocyanate selected from the group consisting of methylene-bis(phenylisocyanate), polyemthylenepoly(phenylisocyanate) and mixtures thereof. By methylene bis(phenylisocyanate) is meant the 2,2'-isomer, the 2,4'-isomer, the 4,4'-isomer, and mixtures thereof. The 4,4'-isomer is presently preferred. The polymethylenepoly(phenylixocyanates) useful in the present invention are generally known and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,006, 3,344,162 and 3,362,979.

The polyester used to make the prepolymer of the present invention has a hydroxyl functionality of from 2 to 3 and has a molecular weight of from about 750 to about 3500 and preferably from about 1000 to about 3000. The polyester is prepared by reacting adipic acid and 1,4-cyclohexanedimethanol in the conventional method used to produce polyester polyols, although it has been found that no esterification catalyst is necessary. While it is preferred that the cyclohexanedimethanol be used as the sole glycol component, up to 50 mole percent of 1,6-hexane diol can be added. Similarly, while it is preferred that adipic acid be used as the sole acid component, up to 50 mol percent of a benzene dicarboxylic acid (or anhydride) can be used to make the polyester. In general, it is preferred that only difunctional materials be used. As is apparent, polyesters having hydroxyl functionalities of greater than 2 can be prepared by using small amounts of polyols or carboxylic acids of functionality greater than 2. Such higher functional materials include trimethylol propane, glycerin, pentaerythritol, trimellitic anhydride, and the like.

The prepolymers are prepared by reacting the isocyanate with the polyester at temperatures of from 25° C. to 125° C. The resultant prepolymer has an isocyanate group content of from about 14% to about 28% by weight, and preferably from about 16 to about 23% by weight. In one particularly preferred embodiment, methylenebis(phenylisocyanate) is first reacted with the polyester to a lower isocyanate content. Thereafter polymethylene-poly-(phenylisocyanate) is added to raise the isocyanate content to the 14 to 28% level.

The prepolymers of the present invention can be reacted in a closed mold via the RIM process with (i) a relatively high molecular weight active hydrogen containing material, and (ii) an amine terminated chain extender.

The high molecular weight active hydrogen group-containing compounds generally have molecular weights of from 1800 to 12,000 and include compounds containing amino groups, thiol groups, carboxyl groups and hydroxyl groups.

The compounds used as component (i) int he process according to the present invention are preferably polyhydroxyl polyethers of polyamino polyethers having molecular weights of from 1800 to 12,000, and most preferably from 3000 to 7000. Polyethers are particularly suitable for the process of the present invention. Preferred are those having at least 2, and preferably 2 or 3 hydroxyl or amino groups. Polyhydroxyl polyethers are known and may be prepared, e.g., by polymerization of epoxides, such as ethylene oxide, propylene oxide, butylene oxide, tetrahydrofuran, styrene oxide or epichlorohydrin, either on their own, e.g. in the presence of BF3, or by a process of chemical addition of these epoxides, optionally as mixtures or successively, to starting components having reactive hydrogen atoms, such as water, ammonia, alcohols, or amines. Examples of suitable starting components include ethylene glycol, propylene glycol-(1,3) or -(2,3), trimethylolpropane, 4,4'-dihydroxydiphenyl propane, aniline, ethanolamine or ethylene diamine. Sucrose polyethers which have been described in German Auslegeschriften No. 1,176,358 and No. 1,064,938 may also be used according to the present invention. It is in many cases preferred to use polyethers which contain predominant amounts of primary OH groups (up to 90%, by weight, based on all the OH groups present in the polyether). Polyethers modified with vinyl polymers are also suitable. These may be obtained, for example, by the polymerization of styrene and acrylonitrile in the present of polyethers (U.S. Pat. Nos. 3,383,351; 3,304,273; 3,523,083 and 3,110,695; and German Patent No. 1,152,536). Polybutadienes having OH groups may also be used.

According to the present invention, there may also be used polyhydroxyl compounds which contain high molecular weight polyadducts or polycondensates in a finely dispersed form or in solution. Such modified polyhydroxyl compounds are obtained when polyaddition reactants (e.g., reactions between polyisocyanates and amino functional compounds) or polycondensation reactions (e.g., between formaldehyde and phenols and-/or amines) are directly carried out in situ in the above-mentioned hydroxyl compounds. Processes for the production of this type of material have been described in German Auslegeschriften No. 1,168,075 and No. 1,260,142 and in German Offenlegugnsschriften Nos. 2,324,134; 2,423,984; 2,152,385; 2,513,815; 2,550,796; 2,550,797; 2,550,833 and 2,550,862. Such polyhydroxyl compounds may also be obtained according to U.S. Pat. No. 3,869,413 or Gernam Offenlegungsschrift No. 2,550,860 by mixing an aqueous polymer dispersion with a polyhydroxyl compound and then removing water from the mixture.

According to the present invention, hydroxyl containing polyesters, polythioethers, polyacetals, polycarbonates or polyester amides of the type known for the production of both homogeneous and cellular polyurethanes may also be used instead of or together with polyether polyols.

Suitable polyesters containing hydroxyl groups include, reaction products of polyhydric, (preferably dihydric alcohols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl tetephthalic and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neophetylglycol, cyclohexanedimethanol (1,4-bis-hydroxymethyl-cyclohexane), 2-methyl-1,3-propane-diol, glycerol, trimethylolpropane, hexanetriol-(1,2,6), butane-triol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols, The polyesters may also contain a proportion of carboxyl end groups. Polyesters of lactones, such as ε-caprolactine or hydroxycarboxylic acids such as w-hydroxycaproic acid may also be used. Where polyesters are used as component (i), it is preferred to use polyesters similar to the polyester used to make the prepolymer. Additionally, other hydrolytically stable polyesters are preferably used in order to obtain the greatest benefit relative to the hydrolytic stability of the final product.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio-mixed ethers, polythioether esters or polythioether ester amides, depending on the co-components.

Suitable polyacetals include, for example, the compounds which may be prepared from glycols, such as diethylene glycol, triethylene glycol, 4,4'-dioxethoxy-diphenylmethyl methane and hexanediol, and formaldehyde. Suitable polyacetals for the purpose of the present invention may also be prepared by the polymerization of cyclic acetals.

The polycarbonates containing hydroxyl groups used may be of the type known. Highly useful are those which may be prepared by the reaction of diols, such as propanediol-(1,3), butane-(1,4) and/or hexanediol-(1,6), diethylene glycol, triethylene glycol or tetraethylene glycol with diarylcarbonates, e.g. diphenylcarbonate, or phosgene.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines and mixtures thereof.

Representatives of the hydroxyl functional compounds which may be used according to the present invention are generally known and have been described, for example in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kinststoff-Handbuch, Volume VII, Vieweg-Hochtlen, Carl-Hanser-Verlag, Munich, 1966, on pages 45 to 71.

Also preferred are polyethers containing primary and/or secondary (preferably primary) aromatically or aliphatically (preferably aliphatically) bound amino groups.

Compounds containing amino end groups may also be attached to the polyether chains by urethane or ester groups. These "amino polyethers" may be prepared by known methods. One such method is the amination of polyhydroxy polyethers (e.g., polypropylene glycol ethers) by a reaction with ammonia in the presence of Raney nickel and hydrogen (Belgian Patent No. 634,751), U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyanoethylated polyoxypropylene ethers is described in German Pat. No. 1,193,671. Other methods for the preparation of polyoxyalkylene (polyether) amines are described in U.S. Pat. Nos. 3,155,728 and 3,236,895 and French Pat. No. 1,551,605. French Patent No. 1,466,708, discloses the preparation of polyethers containing secondary amino end groups.

Relatively high molecular weight polyhydroxypolyethers suitable for the process of the present invention may be converted into the corresponding anthranilic acid esters by reaction with isatoic acid anhydride. German Offenlegugnsschriften Nos. 2,019,432 and 2,619,840 and U.S. Pat. Nos. 3,808,250; 3,975,428 and 4,016,143 discloses methods for making polyethers containing aromatic amino end groups.

Relatively high molecular weight compounds containing amino end groups may be obtained according to German Offenlegungsschrift Nos. 2,546,536 or U.S. Pat. No. 3,865,791 by reacting diocyanate prepolymers based on polyhydroxy polyethers with hydroxyl-containing enamines, aldimines or ketimines and hydroxyzing the reaction product.

The aminopolyethers which have been obtained by the hydrolysis of compounds containing isocyanate end groups are preferred starting materials (German Offenlegungsschrift No. 2,948,419). Polyethers preferably containing two or three hydroxyl groups are reacted (in the process disclosed in German Offenlegungsschrift No. 2,948,419) with polyisocyanates to form isocyanate prepolymers and the isocyanate group is then converted in a second step into an amino group by hydrolysis.

The "amino polyethers" used in the present invention are in many cases mixtures of the compounds described above. These mixtures generally should contain (on a statistical average) two to three isocyanate reactive end groups.

In the process of the present invention, the "amino polyethers" may also be used as mixtures with polyhydroxyl polyethers which are free from amino groups.

The amine terminated chain extender used as component (ii) in the process of the present invention generally has a molecular weight from 108 to 400 and preferably contains exclusively aromatically bound primary or secondary (preferably primary) amino groups. Examples of such diamines are: 1,4-diaminobenzene, 2,4-diaminotoluene, 2,4'- and/or 4,4'-diaminodiphenyl methane, 3,3'-dimethyl-4,4'-diaminodiphenyl methane, 4,4'-diaminodiphenyl propane-(2,2) t-butyl toluene diamine, 1-methyl-3,5-bis(methylthio)-2,4- and/or 2,6-diaminobenzene, and mixtures of such diamines.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 3 carbon atoms. It is particularly preferred to use such compounds in which an ethyl, n-propyl and/or isopropyl substituent is present in at least one position ortho to the amino groups and possibly methyl substituents in other positions ortho to the amino groups.

Specific examples of preferred amines are: 2,4-diaminomesitylene, 1,3,5-triethyl-2,4-diamino-benzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminophenyl methane and 3,5-diethyl-3',5'-diisopropyl-4,4-diaminophenyl methane.

The above-mentioned aromatic diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene.

The diamine chain lengthening agent in the RIM process of the present invention is preferably used in quantities of from 5 to 50% by weight, and most preferably from 10 to 40% by weight (based on the weight of component (i)).

One of the main advantages of the process of the present invention (in contrast to that of German Offenlegungsschrift 2,622,951) is that know internal mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 3,365,215), German Offenlegungsschrift 2,431,968 (U.S. Pat. No. 4,098,731) or in German Offenlegungsschrift 2,404,310 (U.S. Pat. No. 4,058,492) are preferred. Preferred mold release agents include the salts (containing at least 25 aliphatic carbon atoms) of fatty acids having at least 12 aliphatic carbon atoms and primary mono-, di or polyamines containing two or more carbon atoms or amines containing amide or ester groups and having at least one primary, secondary or tertiary amino group; esters of mono- and/or polyfunctional carboxylic acids and polyfunctional alcohols containing saturated and-/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes.

The oleic acid or tall oil fatty acid salts of the amine containing amide groups which has been obtained by the reaction of N-dimethylaminopropylamine with oleic acid or tall oil fatty acid is particularly preferred.

Apart from the above-described preferred mold release agents, other mold release agents known in the art may in principle by used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono-and/or polyisocyanates (according to German Offenlegungsschrift 2,356,692 (U.S. Pat. No. 4,033,912)); esters of mono- and/or polycarboxylic acids and polysiloxanes containing hydroxy methyl groups (according to German Offenlegungsschrift 2,363,452 (U.S. Pat. No. 4,024,090)); and salts of polysiloxanes containing amino groups and fatty acids (according to German Offenlegungsschrift 2,417,273 or German Offenlegungsschrift 2,431,968 (U.S. Pat. No. 4,098,731)).

Also preferred are the zinc salts, e.g., zinc stearate, described in U.S. Pat. Nos. 4,581,386 and 4,519,965.

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the reactants. However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methylmorpholine, N-ethylmorphine, N-cocomorpholine, N,N,N',N'-tetramethylene diamine, 1,4-diazabicyclo-(2,2,2)-octane, N-methyl-N'-dimethylaminoethyl piperazine, N,N'-dimethylbenzylamine, bis-(N,N-diethylaminoethyl)-adipate, N,N-diethyl benzylamine, pentamethyl diethylene triamine, N,N-dimethyl-cycloshexylamine, N,N,N',N'tetramethyl-1,3-butanediamine, N,N-dimethylimidazolephenyl-ethylamine, 1,2-dimethylimidazole and 2-methylimidazole.

Organometallic catalysts may also be used in the practice of the present invention. Particularly useful organometallic catalysts include organic tin catalysts such as tin- (II) salts of carboxylic acids (e.g., tin-(II)-acetate, tin-(II)-octoate, tin-(II)ethyl hexoate and tin-(II-laurate) and the dialkyl tin salts of carboxylic acids (e.g., dibutyl-tin-diacetate, dibutyl-tin-dilaurate, dibutyl-tin-maleate or dioctyl-tin-diacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt %, preferably 0.05 to 1 wt. % (based on component (i)) are appropriate.

The products of the process of the present invention are preferably compact molded articles. However, blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodifluoromethane and dichlorodifluoromethane; and butane, hexane, heptane or ditheryl ether.

Nitrogen, air and carbon dioxide are examples of suitable inert gases.

The effect of a blowing agent may also be obtained by the addition of compounds which decompose at temperatures above room temperature to release gases, for example, nitrogen. Azo compounds such as axoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g., on pages 108 and 109, 453 to 455 and 507 to 510.

In accordance with the present invention, surface active additives (emulsifiers and foram stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g., of dodecyl benzene sulfonic acid or of dinaphthyl methane disulfonic acid) or of fatty acids such as eicinoleic acid or of polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g., tris-chloroethyl phosphate or ammonium phosphate and polyphosphate), stabilizers against ageing and weathering, plasticizers, fungistatic and bacteriostatic substances, and fillers (such as barium sulfate, glass fivers, kieselguhr or whiting).

Other examples of suitable surface active additives and foram stabilizers, flame retardants, plasticizers, dyes, fillers and fungistatic and bacteriostatic substances and details concenring the use and mode of action of these additives may be found in Kunststoff Handbuch, volume VII, published by Viewed and Hochtlen, Carl Hanser Verlag, Munich 1966, e.g., on pages 103 to 113.

Examples of other auxiliary agents and additives which may be used include low molecular weight polyhydric alcohols having a molecular weight of from 62 to 500, preferably from 62 to 400 (in quantities of up to 50 equivalent percent, based on the isocyanate reactive groups of the diamine used as component (ii)) in addition to the chain lengthening agent (component (ii)) to modify the properties of the molded articles. Ethylene glycol, butane-1,4-diol, hexamethylene glycol, trimethylolpropane, diethylene glycol, triethylene glycol, dipropylene glycol, tripropylene glycol, the pfopoxylation products of trimethylol propane having molecular weights of up to 500, preferably of up to 400 or the propoxylation products of ethylene diamine having molecular weights of up to 500, preferably of up to 400 are examples of such alcohols. The addition of such low molecular weight polyhydroxyl compounds is, however, less preferred.

When carrying out the process of the present invention, the quantity of prepolymer should preferably be such that the isocyanate index is from 70 to 130, most preferably 90 to 110 in the reaction mixture. By "isocyanate index" is meant the quotient of the number of isocyanate groups divided by the number of isocyanate reactive groups, multiplied by 100. When calculating the isocyanate index, any isocyanate reactive groups possibly present in the mold release agents (carboxyl groups) are not taken into account.

The process of the present invention is carried out by the known reaction injection molding technique (RIM process). Two streams are generally employed in this molding technique. In the present invention, the prepolymer is the first stream and components (i) and (ii) make up the second stream. If any auxiliary agents or additives are used, they are generally mixed with components (i) and (ii). However, it may be advantageous, for example when using a mold release agent containing isocyanate groups, to incorporate the release agent with the prepolymer before the RIM process is carried out. It is possible in principle to use mixing heads in which three or four separate components may be simultaneously introduced so that no preliminary mixing of the individual components is required. The quantity of reaction mixture introduced into the mold is generally calculated to produce molded articles having a density of from 0.8 to 1.4 g/cm$^3$ preferably from 0.9 to 1.2 g/cm$^3$. When mineral fillers are used, however, the molded articles may have a density above 1.2 g/cm$^3$. The articles may be removed from the mold after they have been left in there for from 5 to 90 seconds, preferably from 20 to 60 seconds.

The reactant mixture is generally introduced into the mold at a starting temperature of from 10 to 60° C., preferably from 20 to 50° C. The temperature of the mold itself is generally from 40 to 100° C., preferably from 50 to 70° C.

The molded articles obtainable by the process of the present invention are particularly suitable for the manufacture of flexible automobile bumpers or car body parts. Appropriate variations of the starting components makes it possible, however, to obtain flexible shoe soles with good abrasion resistance and excellent mechanical strength.

When compared to parts made from the earlier ester-based prepolymer (i.e., from the ester of adipic acid, ethylene glycol and butane diol) parts made from the prepolymers of the invention exhibit several significant advantages. First, the parts are transparent, as opposed to being opaque. In addition, the parts based on the present prepolymers shows no flow lines (indicating good mixing) and displayed excellent green strength. The physical properties of parts from the polyester-based prepolymers herein showed higher flexural modulus and comparable green strength, density, elongation, Izod impact and heat sags. Furthermore, parts made according to the present invention were hydrolytically more stable.

The invention is further illustrated but is not intended to be limited by the following examples in which all parts and percentages are by weight unless otherwise specified.

EXAMPLES

The apparatus used to produce the polyester of Example 1 consisted of a vacuum jacketed distilling column with metal packing, a variable reflux ratio distilling head with a round bottom flask attached to it to receive the water and excess glycols, a twelve liter three neck flask, a thermo-regulator, and a heating mantle.

EXAMPLE 1—POLYESTER/MOL. WT. about 2100

The flask was charged with 4785 parts of 1,4-cyclohexanedimethanol. Nitrogen was bubbled through the flask and the temperature of the flask raised to 160° C. 4266 parts of adipic acid were slowly added with stirring and temperature raised to 220° C. at the completion of addition. Water was collected in the receiving flask. After the atmospheric cycle, vacuum was slowly applied to the system and more water was distilled over (948 parts total water was collected). The polyester gave by titration an acid number of less than 1 and an OH number of about 54.

EXAMPLE 2—PREPOLYMER

In Examples 2, the following isocyanates were used:
i) MDI: 4,4'methylenebis(phenylisocyanate)
ii) POLY-MDI: a polymethylene poly (phenylisocyanate) having an isocyanate group content of 31.9%, an equivalent weight of 132, and a viscosity of 25° C. of 80 mPa.s 2303 parts of the polyester of Example 1 were slowly added to a rapidly stirring solution of 3697 parts of MDI and 1500 parts of POLY-MDI at 60° C. After completion of addition, the mixture was held at 60° C. for one and a half hours. The percent NCO of the material was about 22%.

EXAMPLE 3—COMPARATIVE PREPOLYMER

The comparative prepolymer was prepared by (i) first reacting 252 parts of MDI, 27 parts of a liquid modified 4,4'-methylenebis(phenyl isocyanate) containing carbodiimide groups and having an isocyanate group content of 29.3% and a viscosity of 25° C. of less than 100 mPa.s, and 169 parts of a polyester diol (having a molecular weight of 2000 and being prepared from adipic acid, ethylene glycol and 1,4-butane diol), and (ii) blending 4800 parts of the resultant product with 1200 parts of POLY-MDI to yield a final product having an isocyanate content of 21.6%.

EXAMPLES 4 AND 5 n Examples 4 and 5, in addition to the prepolymers of Examples 2 and 3, the following materials were used:
ATP: an amine terminated polyether having an amine number of about 43 and being prepared by hydrolyzing a prepolymer formed from toluene diisocyanate and a 2:1 mixture of a trimethylolpropane/propylene oxide polyether (OH number of 56) and a gylcerin/-propylene oxide/ethyene oxide polyether (OH number of 35 and having primary hydroxyl group termination).
DETDA: an 80:20 mixture of 1-methyl-3,5-diethyl-2,4- and 2,6-phenylene diamine
EDA/PO: a reaction product of ethylene diamine and propylene oxide having an OH number of about 630.
ZN: zinc stearate.
L5304; a silicone surfactant available from Union Carbide.
DB OIL: a castor oil available from Caschem.

RIM plaques were prepared using a laboratory piston metering unit and clamping unit. The metering unit was a two component instrument having a maximum metering capacity of 0.6 liters. A 300 mm×200 mm×3 mm rectangular mold was used to mold the samples under the following conditions:

| | |
|---|---|
| Component A (prepolymer) temperature | 65° C. |
| Component B temperature | 45° C. |
| Isocyanate Index | 105 |
| Mold Temperature | 65° C. |

-continued

| Demold time | 45 seconds |

The formulations used and the physical properties were as indicated in the following table. The samples were tested for density (ASTM D-792), flex modulus (ASTM D-790), elongation (ASTM D-638), heat sag (ASTM D-3769) and notched Izod (ASTM D-256). Example 4 was a comparative example.

TABLE

| Example | 4 | 5 |
| --- | --- | --- |
| Component B | | |
| ATP | 65.75 | 65.75 |
| DETDA | 26.0 | 26.0 |
| EDA/PO | 3.0 | 3.0 |
| ZN | 2.5 | 2.5 |
| DB OIL | 2.0 | 2.0 |
| L5304 | 0.75 | 0.75 |
| Component A | | |
| Prepolymer of Example 2 | 75.3 | — |
| Prepolymer of Example 3 | — | 75.0 |
| Density, gm/cm$^3$ | 1.12 | 1.11 |
| Flex. Modulus, N/mm$^2$ | 646 | 714 |
| Elongation, % | 135 | 110 |
| Izod impact, N-mm/mm | 325 | 302 |
| Heat sag: | | |
| 1 hr. 10 cm. 163° C., mm | 4.5 | 6.7 |
| 1 hr. 15 cm. 121° C., mm | 3.8 | 5.2 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate terminated prepolymer comprising the reaction product of
   (a) an isocyanate selected from the group consisting of methylenebis(phenylisocyanate), polymethylenepoly(phenylisocyanate), and mixtures thereof, and
   (b) a polyester polyol having a hydroxyl functionality of from 2 to 3 and a molecular weight of from about 750 to about 3500, said polyester polyol prepared by reacting 1,4-cyclohexanedimethanol and adipic acid, the isocyanate group content of said reaction product being from about 14% to about 28% by weight.

2. The prepolymer of claim 1, wherein said polyester has a molecular weight of from about 1000 to about 3000.

3. The prepolymer of claim 1, having an isocyanate group content of from about 16 to about 23% by weight.

4. A process for preparing a reaction injection molded part by reacting a reaction mixture in a closed mold via the RIM process, said mixture comprising
   i) a relatively high molecular weight active hydrogen containing material,
   ii) an amine terminated chain extender and
   iii) an isocyanate terminated prepolymer comprising the reaction product of
      (a) an isocyanate selected from the group consisting of methylenebis(phenyisocyanate), polymethylenepoly(phenylisocyanate), and mixtures thereof, and
      (b) a polyester polyol having a hydroxyl functionality of from 2 to 3 and a molecular weight of from about 750 to about 3500, said polyester polyol prepared by reacting 1,4-cyclohexanedimethanol and adipic acid,
   the isocyanate group content of said reaction product from about 14% to about 25% by weight.

5. The process of claim 4 wherein component i) has a molecular weight of from 1800 to 12,000.

6. The process of claim 5, wherein component ii) has a molecular weight of from 108 to 400.

7. The product produced by the process of claim 4.

* * * * *